United States Patent [19]

Daggett et al.

[11] Patent Number: 5,216,519
[45] Date of Patent: Jun. 1, 1993

[54] ECHO PROTECTION TONE DETECTION AND REGENERATION FOR DIGITAL TRANSMISSION OF FACSIMILE CALLS

[75] Inventors: Ronald L. Daggett, Red Bank; Richard D. Wesel, Matawan, both of N.J.

[73] Assignee: AT&T Bell Laboratories, Murray Hill, N.J.

[21] Appl. No.: 947,355

[22] Filed: Sep. 18, 1992

Related U.S. Application Data

[63] Continuation of Ser. No. 589,137, Sep. 27, 1990, abandoned.

[51] Int. Cl.$^5$ ............................................. H04N 1/00
[52] U.S. Cl. .................................... 358/434; 358/435; 358/436; 358/438; 358/439; 358/402; 379/406; 370/32.1
[58] Field of Search ............... 379/406, 408, 410, 407, 379/411, 3; 358/434, 435, 436, 438, 439, 402, 403; 370/32.1

[56] References Cited

U.S. PATENT DOCUMENTS

| | | | |
|---|---|---|---|
| 4,353,095 | 10/1982 | Tatematsu et al. | 358/426 |
| 4,403,298 | 9/1983 | May, Jr. | 379/386 |
| 4,519,081 | 5/1985 | Sugie | 358/438 |
| 4,885,755 | 12/1989 | Yoshida | 358/438 |
| 5,029,204 | 7/1991 | Shenoi et al. | 370/32.1 |
| 5,041,917 | 8/1991 | Koshiishi | 358/434 |
| 5,050,160 | 9/1991 | Fuda | 370/32.1 |

*Primary Examiner*—Edward L. Coles, Sr.
*Assistant Examiner*—Thomas L. Stoll
*Attorney, Agent, or Firm*—Thomas Stafford

[57] ABSTRACT

A transmission arrangement is disclosed which facilitates compression of modem modulated facsimile signals for transmission on digital facilities. The presence of a facsimile call is detected and facsimile control messages are obtained by demodulating and interpreting the facsimile call control protocol. A controller is responsive to the obtained control messages for controlling a voiceband encoder to encode the control portion of the facsimile call and for controlling a so-called facsimile page demodulator to demodulate any facsimile page portions of the facsimile call to obtain a baseband digital bit stream. The presence of prescribed tone signals, i.e., echo protection tone (EPT) signals, is detected in the facsimile call. EPT control messages representative of the EPT signals are generated. The encoded control portion of the facsimile call and the baseband digital bit stream representative of the demodulated, i.e., compressed, facsimile page portion of the facsimile call are transmitted along with control information (as side information) and the EPT control messages to a receiver. At the receiver, a replica of the original modem modulated facsimile signal is reconstructed in response to the control information and by decoding the control portion of the facsimile call and by remodulating the digital bit stream representative of the facsimile page portion of the facsimile call. If EPT control messages are received, the corresponding echo protection tone signal is regenerated for inclusion in the remodulated facsimile signal.

12 Claims, 9 Drawing Sheets

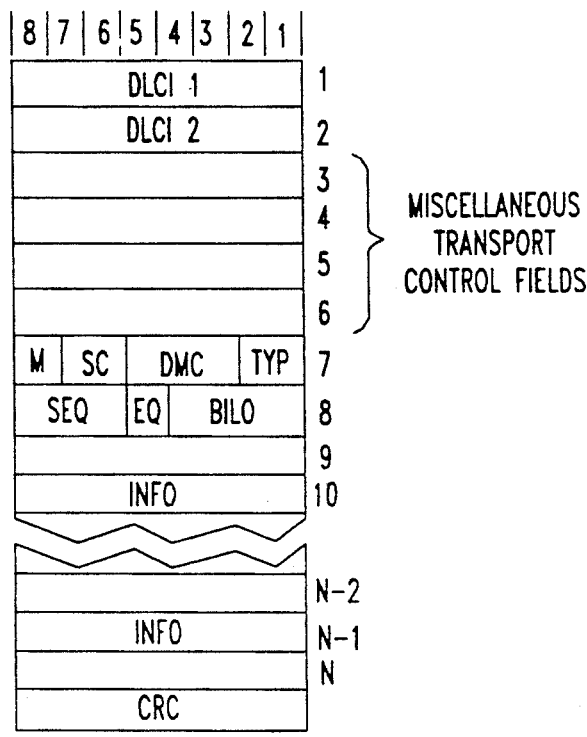
FIG. 8  FACSIMILE PACKET FORMAT
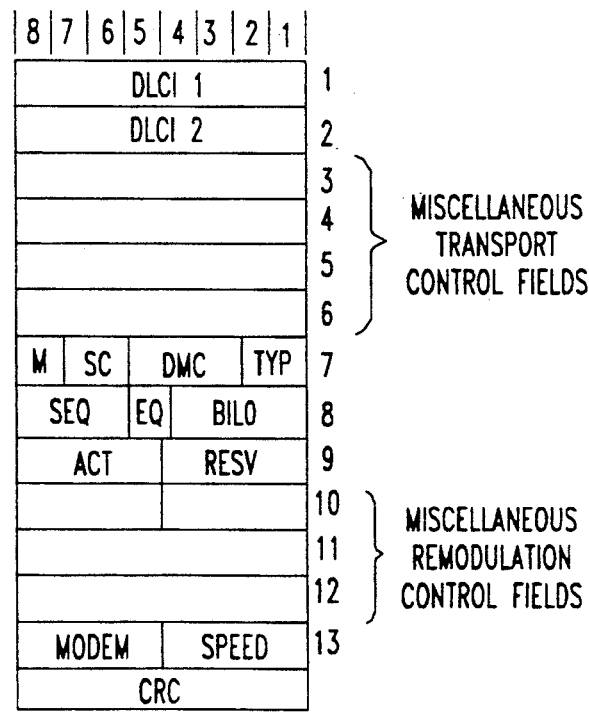
FIG. 9  PACKET FORMAT FOR TYPE = SPURT HEADER

5,216,519

ECHO PROTECTION TONE DETECTION AND REGENERATION FOR DIGITAL TRANSMISSION OF FACSIMILE CALLS

This application is a continuation of application Ser. No. 07/589,137, filed on Sep. 27, 1990, now abandoned.

TECHNICAL FIELD

This invention relates to digital transmission of voiceband signals and, more particularly, to transmission of voiceband facsimile signals.

BACKGROUND OF THE INVENTION

Recently, efficienies have been realized in the digital transmission of facsimile calls by demodulation and remodulation of the page portion of the call. This enables that portion of the facsimile call to be efficiently transmitted over a digital transmission facility. One such arrangement is disclosed in U.S. patent application of D. O. Anderton and R. L. Daggett Ser. No. 428,560, filed Oct. 30, 1989.

In a prior arrangement, operation of a facsimile page demodulator in a transmitter and a facsimile page remodulator in a receiver is controlled in response to a control message in the facsimile control protocol. In certain facsimile arrangements, particular tone signals are transmitted after the facsimile control protocol message indicating that page data is imminent and before the actual page data arrives. These tone signals are called echo protection tones and are intended to prevent any echo suppressors in the transmission facility from attenuating the facsimile page data. In the prior facsimile demodulation and remodulation transmission arrangement, these tones were not regenerated. Consequently, any echo suppressors in the transmission facility could possibly attenuate the facsimile page data and, thus, corrupt the facsimile transmission. A possible result is that a facsimile machine may fail to receive the facsimile page data. This is extremely undesirable.

SUMMARY OF THE INVENTION

The problem relating to transmission of such facsimile echo protection tone signals is overcome, in accordance with the invention, by detecting in a transmitter the presence of tone signals occurring after the detection of the facsimile control message indicating that page data is imminent and by generating control messages representative of the echo protection tone signals. The control messages are transmitted to a transmission receiver where they are used in a facsimile remodulator to regenerate the echo protection tone signals.

Detection of the echo protection tone signals is realized by rapidly discriminating between so-called modem training sequence alternations and tones.

More specifically, the tones are detected by employing an adaptive tone detector. The alternations are detected by a training sequence detector. An arbiter utilizes outputs from the tone detector and a training sequence detector to discriminate between the echo protection tone signals and alternations, and to generate control messages indicating that regeneration of an echo protection tone signal should start and stop, the frequency of the echo protection tone signal, that the training sequence is in progress and that page demodulation has ended.

BRIEF DESCRIPTION OF THE DRAWING

In the Drawing:

FIG. 8 graphically illustrates a facsimile packet format used in transmission network 102 of FIG. 1;

FIG. 9 graphically shows another packet format used in transmission network 102 of FIG. 1;

DETAILED DESCRIPTION

Figure 1:
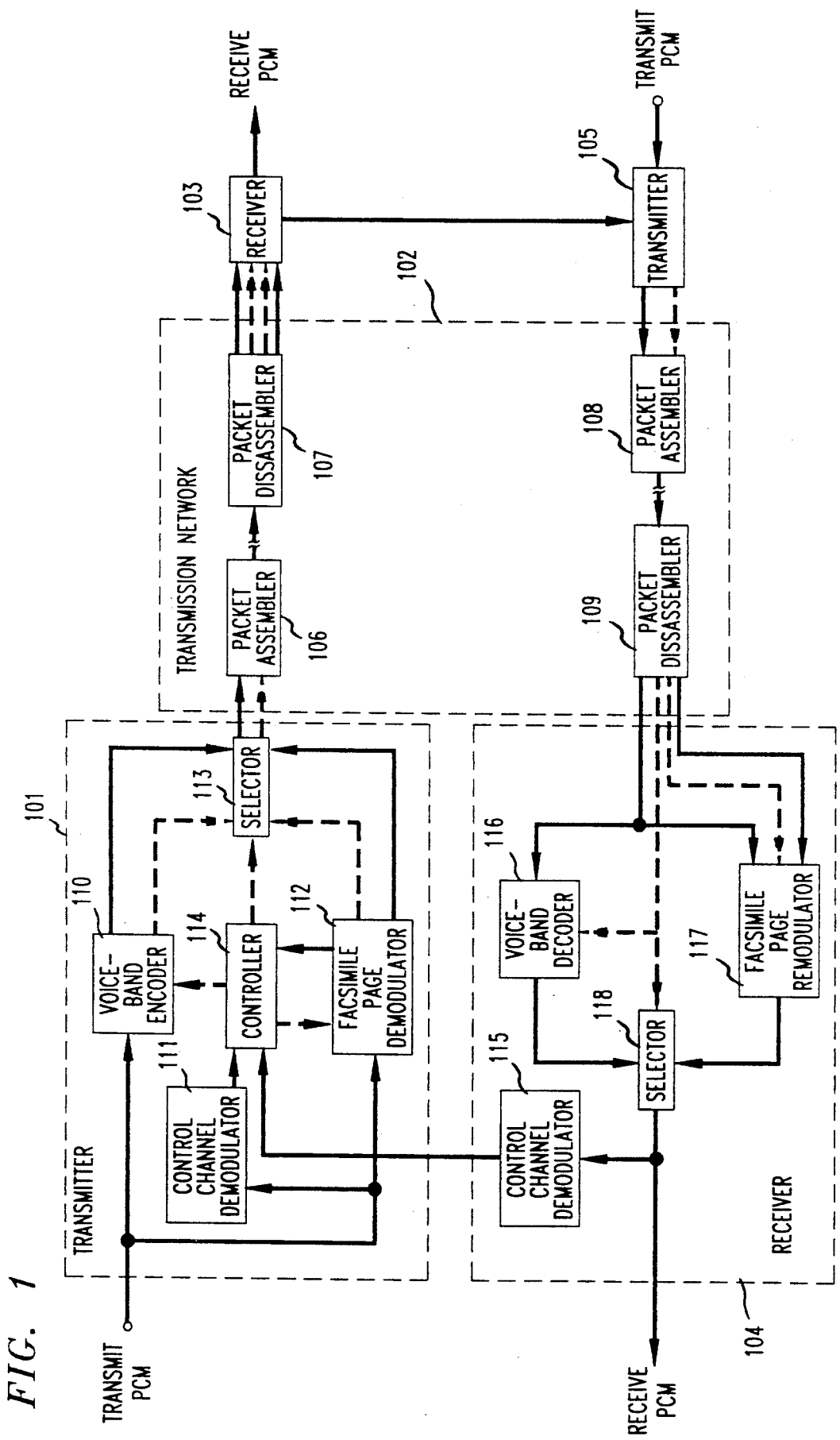
FIG. 1 shows, in simplified block diagram form, details of a transmission system including an embodiment of the invention.

FIG. 1 shows, in simplified block diagram form, a transmission system for compressing facsimile signals including an embodiment of the invention. Accordingly, shown are near-end transmitter 101 and far-end receiver 103 which are employed in conjunction with transmission network 102 for a first direction of transmission. Also shown are near-end receiver 104 and far-end transmitter 105 which are employed in conjunction with transmission network 102 for a second direction of transmission. In this example, transmission network 102 is shown as including packet assembler 106 and packet disassembler 107 for transmission in the first direction, and packet assembler 108 and packet disassembler 109 for transmission in the second direction. The transmissions between the near-end and far-end may be over any desired transmission medium. To this end, packet assemblers 106 and 108 include apparatus for supplying the assembled packets to the transmission medium and packet disassemblers 107 and 109 include apparatus for obtaining packets to be disassembled from the transmission medium. It is noted that transmitter 101, packet assembler 106, packet disassembler 107 and receiver 103 used in the first direction of transmission are, in this example, identical in structure and operation to their counterparts used in the second direction of transmission, namely, transmitter 105, packet assembler 108, packet disassembler 109 and receiver 104. Such packet assemblers and disassemblers are known in the art (see for example, U.S. Pat. No. 4,703,477, issued Oct. 27, 1987). Consequently, only transmitter 101 and receiver 104 will be described in detail.

Transmit pulse code modulation (PCM) signals are supplied to transmitter 101 to be compressed for transmission via transmission network 102 to remote receiver 103, where they are reconstituted as received versions of the original PCM signals. The PCM signals are, in this example, well known DS0 channels from the DS1 format or channels from the CEPT1 Primary Digital Signal. It will be apparent to those skilled in the art that other signal formats, digital or otherwise, may be equally employed in practicing the invention.

The transmit PCM signals are supplied in transmitter 101 to voiceband encoder 110, control channel demodulator 111 and facsimile page demodulator 112. Voiceband encoder 110 may be any of known encoders employed in compressing voiceband PCM signals. In this example, an Adaptive Differential PCM (ADPCM) encoder is employed. Such ADPCM encoders are now well known in the art (see, for example CCITT Standard G. 721). The compressed PCM signals from voiceband encoder 110 are supplied to one input of selector 113. Additionally, when voiceband encoder 110 is enabled, it also supplies a control signal for transmission to selector 113 indicating the enabled condition. This control signal (FAX) is an indication that non-page voiceband signals are being transmitted and facsimile page demodulator 112 is disabled, i.e., FAX=0. During a facsimile call voiceband encoder 110 is enabled in response to the FAX control signal from controller 114 to compress the control portion of the facsimile call.

When facsimile page demodulator 112 is enabled, i.e., FAX=1, encoder 110 is disabled. Since an ADPCM encoder is employed in this example, it is reset to known initial state conditions in response to the FAX=1 control signal. It is noted that the control portion of the facsimile call is communicated with so-called low speed voiceband data and, therefore, is compressible using ADPCM. Although an ADPCM encoder is employed in this example, it will be apparent to those skilled in the art that some other type encoder may equally be employed that may require some other form of control or no control, e.g., a PCM encoder.

Figure 5:
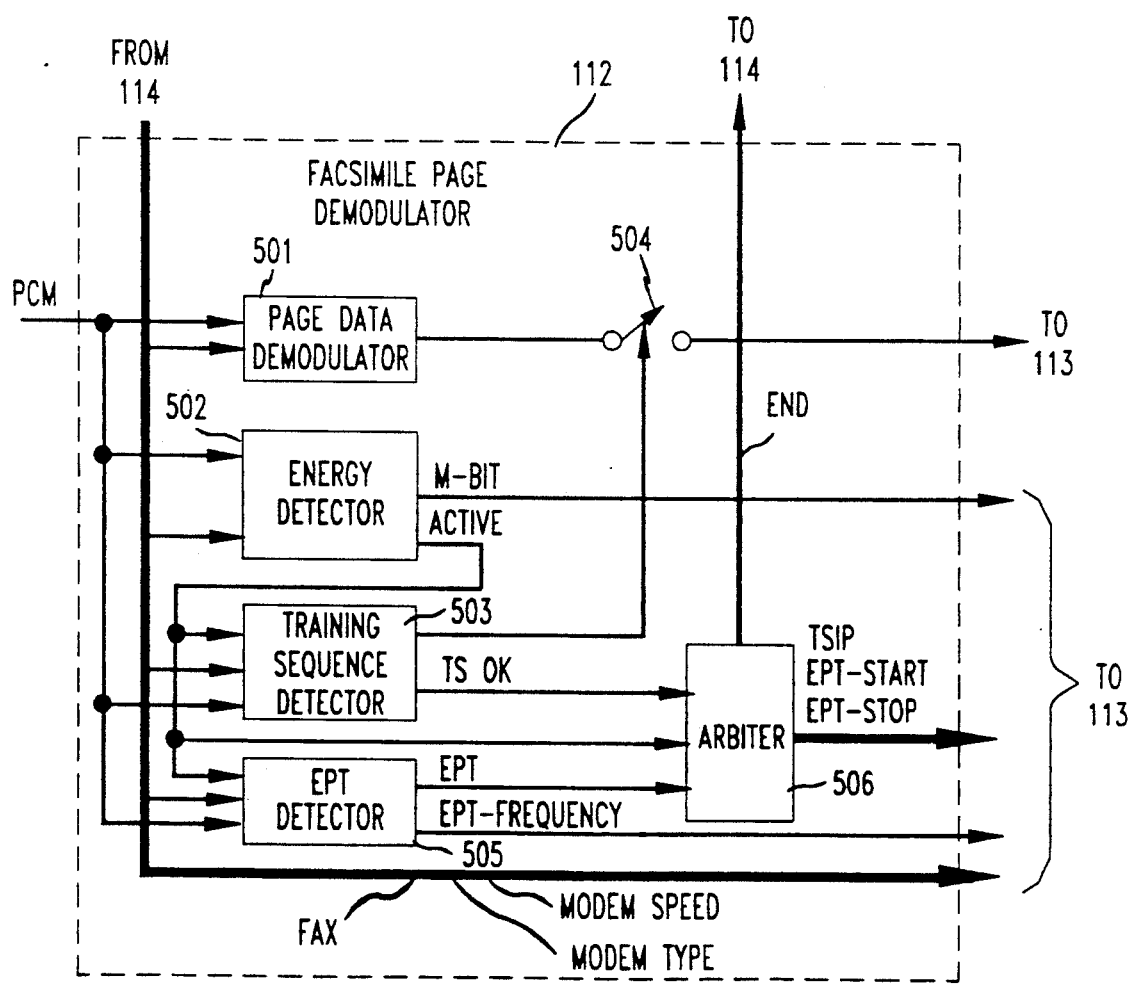
FIG. 5 shows, in simplified block diagram form, details of facsimile page demodulator 112 of FIG. 1.

Facsimile page demodulator 112 is a so-called modem demodulator which is enabled and disabled in response to the FAX control signal from controller 114. Facsimile page demodulator 112 is enabled when FAX=1. Additionally, facsimile page demodulator 112 is responsive to other control signals from controller 114 to demodulate the modem modulated page portion of the facsimile call. It is noted that the modem modulated signals representative of the information on a document page are demodulated to obtain a so-called baseband digital bit stream. In this manner, the bandwidth required to transmit the page portion of the facsimile call is significantly reduced. Facsimile page demodulator 112 is responsive to control signals from controller 114 to select the modem type and modem speed, i.e., the transmission rate, corresponding to the supplied facsimile signal to be demodulated. Additionally, facsimile page demodulator 112 is responsive to the supplied PCM signals to determine, in accordance with the invention, if an echo protection tone (EPT) is present, the presence of a facsimile signal and the end of the facsimile signal, and supplies a so-called end of modulation (END) signal indicating the same to controller 114. An output from facsimile page demodulator 112 is supplied to a second input of selector 113. Facsimile page demodulator 112 also supplies a plurality of so-called control signals for transmission to selector 113 which are described below. In one example, the facsimile page information is transmitted in the CCITT Recommendation V.29 format. It will be apparent that facsimile page demodulator 112 also operates to demodulate partial page facsimile transmissions in a facsimile call (see for example CCITT Recommendation T.30, Revised, entitled "Procedures For Document Facsimile Transmission In The General Switched Telephone Network", which is included in CCITT document AP 1X-24 E, dated March 1988, pages 33–128). Details of facsimile page demodulator 112 are shown in FIG. 5 and described below.

For clarity of description, the voiceband and control outputs from voiceband encoder 110 and facsimile page demodulator 112 are shown as being supplied to a separate selector 113. However, it will be apparent that the selection function is readily realized by simply switching outputs of voiceband encoder 110 and facsimile page demodulator 112. It is noted that the control signals in this example, accompany the demodulated baseband digital bit stream as so-called side information by being placed in appropriate fields of a packet header in packet assembler 106 in a manner that will be apparent to those skilled in the art.

Control channel demodulator 111 demodulates the control component of any facsimile signals supplied in a PCM channel time slot to obtain the control messages therefrom. In this manner, the presence of a facsimile call is detected without prior knowledge of its existence. These control messages are supplied to controller 114. In one example, the facsimile control messages are transmitted in the CCITT Recommendation V.21 format. Control messages are obtained from a received channel via control channel demodulator 115 in a similar manner and supplied to controller 114. Control channel demodulators 111 and 115 are identical in structure and operation and are described below in conjunction with FIG. 4. It is to be noted that although both control channels demodulators 111 and 115 are being shown for clarity of description, a single such control channel demodulator is typically used in practice to demodulate both the transmit and receive control channels since they are half duplex.

Controller 114 in response to the control messages from control channel demodulators 111 and 115, and the end of modulation (END) signal from facsimile page demodulator 112, generates control signals for enabling and disabling voiceband encoder 110, for enabling and disabling facsimile page demodulator 112, and for providing modem type and speed thereto, and for controlling the output selection via selector 113. Control information accompanies the selected output from selector 113 which is supplied to transmission network 102 and, therein, to packet assembler 106. In this example, as indicated above, the selected facsimile and control signals are supplied to packet assembler 106 to be formed into packets and transmitted via a transmission medium to a remote packet disassembler 107 and, in turn, to receiver 103. Control information accompanying the channel is inserted into predetermined fields in the header of the packets, in well known fashion and is described below in conjunction with FIGS. 8 and 9 for facsimile packets. Selector 113 is responsive to control signals from controller 114 to select an output from either voiceband encoder 110 or facsimile page demodulator 112 and supply the selected output to packet assembler 106. As indicated above, this output selection function is readily realized in voiceband encoder 110 and facsimile page demodulator 112.

Figure 7:
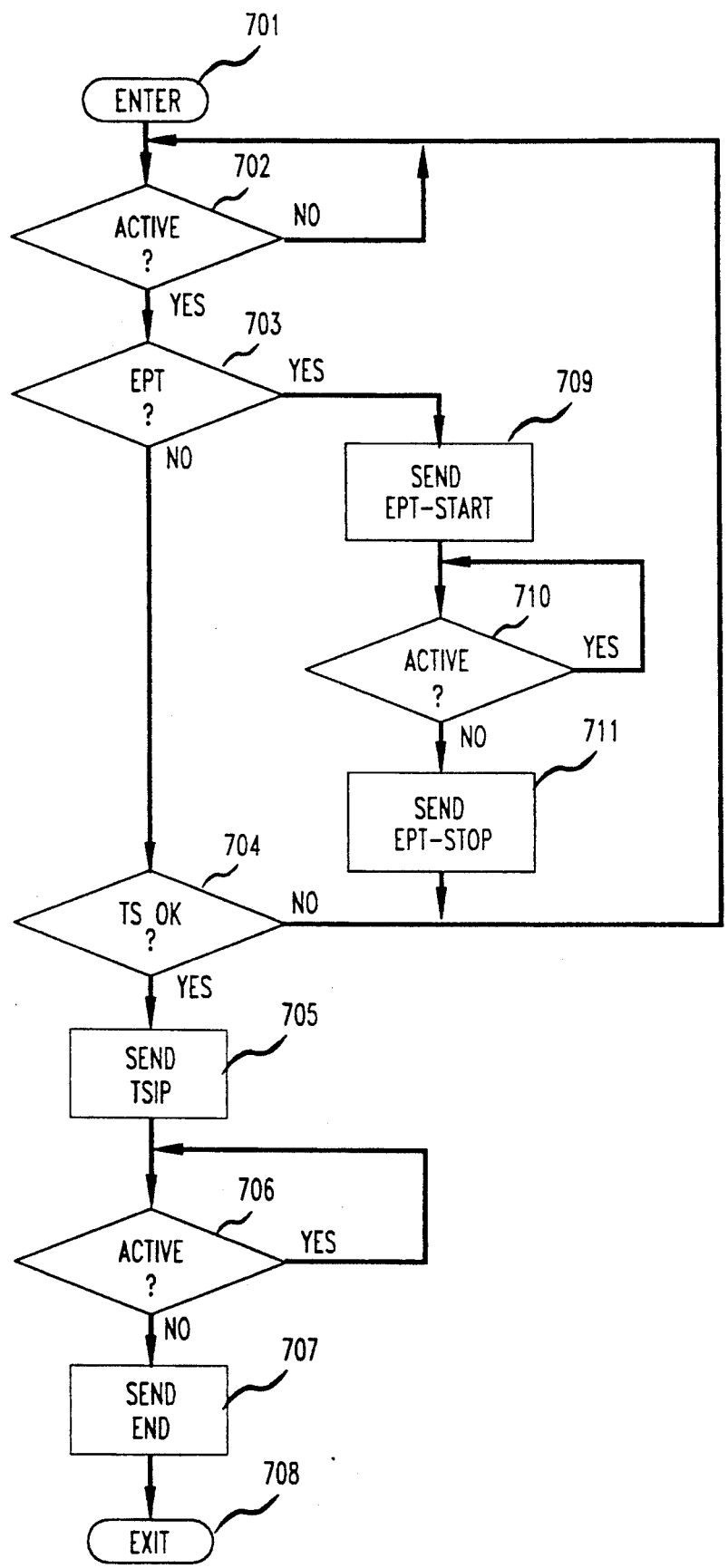
FIG. 7 is a flow chart depicting the operation of arbiter 506 of FIG. 5.

From a received channel, packet disassembler 109 obtains a plurality of control signals, namely, FAX, MODEM TYPE, MODEM SPEED, TSIP, EPT- FREQUENCY, EPT-START, EPT-STOP and the M-bit signal from the received packet header and supplies them appropriately to voiceband decoder 116, facsimile page remodulator 117 and selector 118. Also supplied to facsimile page remodulator 117 from depacketizer 109 is a signal indicating whether a packet is present, namely, PKT. Packet disassembler 109 also supplies the channel baseband digital bit stream (BITS) from the packet information field to voiceband decoder 116 and facsimile page remodulator 117. If the received channel contains other than facsimile page information, i.e., voiceband signals as determined by FAX=0, voiceband decoder 116 is enabled and selector 118 is controlled to select the output from voiceband decoder 116 as the received PCM signal. Voiceband decoder 116, in this example, is an ADPCM decoder which is compatible with voiceband encoder 110 (see CCITT Recommendation G.721). Again, during a facsimile call the control portion of the facsimile signal is transmitted as a voiceband signal. Although an ADPCM decoder is employed in this example, it will be apparent to those skilled in the art that some other type decoder may equally be employed that may require some other form of control or no control, e.g., a PCM decoder. Upon termination of a signal to be decoded, voiceband decoder 116 resets to prescribed initial state conditions. If the channel contains demodulated facsimile page information, a control signal, in this example, FAX=1, enables facsimile page remodulator 117. If EPT-START, EPT-FREQUENCY and EPT-STOP control messages are present, facsimile page remodulator 117, in accordance with the invention, regenerates the appropriate echo protection tone (EPT). Then, in response to other of the control signals, facsimile page remodulator 117, remodulates the facsimile page data, i.e., the baseband digital bit stream, to obtain a replica of the original facsimile signal and selector 118 is controlled to select the output from facsimile page remodulator 117 as the received PCM signal. It will be apparent that facsimile page remodulator 117 also operates to remodulate partial page facsimile transmissions in a facsimile call (again, see the CCITT recommendation T.30, Revised, cited above). Details of facsimile page remodulator 117 are shown in FIG. 7 and described below. As in transmitter 101, the output selection is readily realized by switching outputs of voiceband decoder 116 and facsimile page remodulator 117. Selector 118 is being separately shown only for clarity of description.

CONTROLLER

Figure 2:
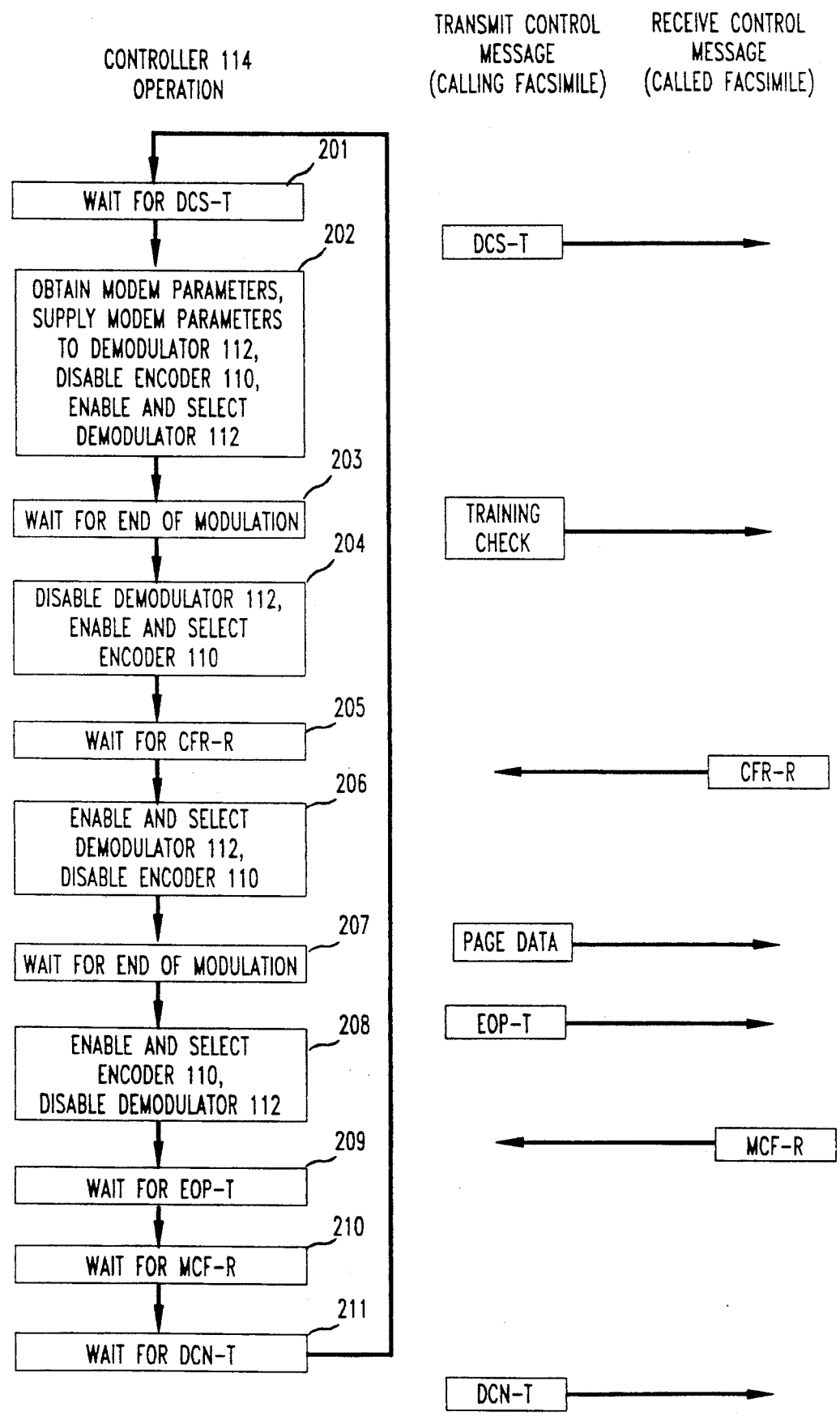
FIG. 2 graphically illustrates operation of controller 114 used in transmitter 101 of FIG. 1 for a standard facsimile call.

For simplicity and clarity of description, two simple examples of the operation of controller 114 will be described. To this end, the right column of FIG. 2 illustrates control signal interaction between transmitter 101 and receiver 103 and transmitter 105 and receiver 104 for a typical CCITT Recommendation G3 standard facsimile call. The left column of FIG. 2 shows the corresponding sequence of operations effected in controller 114. Controller 114 provides control information to voiceband encoder 110, facsimile page demodulator 112 and selector 113. Additionally, controller 114 provides both control information and channel information to packet assembler 106 via voiceband encoder 110 and facsimile page demodulator 112. In this example, it is assumed that a facsimile call has been established either by the standard exchange of facsimile tone signals between the near-end and far-end facsimile apparatus (not shown), or otherwise, as will be apparent to those skilled in the art. The control messages used in this example are standard CCITT facsimile control messages as described in CCITT Recommendation T.30, Revised, cited above.

As shown in FIG. 2, controller 114 is initially in idle state 201 waiting for transmit control message DCS-T (Digital Command Signal) from control channel demodulator 111 in transmitter 101 (FIG. 1). Upon receiving DCS-T, controller 114 enters state 202 and extracts modem parameters indicating the modem type and modem speed, i.e., the modem transmission rate, for this facsimile call from known fields in the transmit control message DCS-T. These modem parameters are supplied to facsimile page demodulator 112. Additionally, controller 114 supplies a disable encoder signal to voiceband encoder 110, a select page demodulator signal to selector 113, an enable page demodulator signal to facsimile page demodulator 112 and the modem parameters, i.e., modem type and speed, to facsimile page demodulator 112. Then, controller 114 enters state 203 and waits for an end of modulation (END) signal which indicates the end of the training check portion of the facsimile call. This end of modulation (END) signal is generated by facsimile page demodulator 112 and supplied to controller 114. Upon reception of the end of modulation (END) signal controller 114 enters state 204 and supplies a disable page demodulator signal to facsimile page demodulator 112, an enable encoder signal to voiceband encoder 110 and a select voiceband encoder signal to selector 113. Then, controller 114 enters state 205 and waits for reception of receive control message CFR-R (Confirmation To Receive) from control channel demodulator 115. In response to receive control message CFR-R, controller 114 enters state 206 and supplies a disable encoder signal to voiceband encoder 110, an enable page demodulator signal to facsimile page demodulator 112 and a select page demodulator signal to selector 113. Then, controller 114 waits while the facsimile page information is demodulated to obtain the desired baseband digital bit stream which is supplied via selector 113 to transmission network 102 and, therein, to packet assembler 106 for transmission to remote packet disassembler 107 and, in turn, to receiver 103. To this end, controller 114 enters state 207 and waits for another end of modulation (END) signal from facsimile page demodulator 112 indicating the end of the facsimile page data. Then, controller 114 enters state 208 and supplies the appropriate control signals to voiceband encoder 110, facsimile page demodulator 112 and selector 113 to select the voiceband path to be supplied to transmission network 102, as described above. Then, controller 114 enters state 209 and waits for transmit control message EOP-T (End of Procedure) and, subsequently, in state 210 waits for receive control message MCF-R (Message Confirmation) from control channel demodulator 115. Finally, controller 114 in state 211 waits for a transmit control message DCN-T (Disconnect) which indicates the end of facsimile call. Thereafter, controller 114 returns to state 201 and waits for a next transmit control message DCS-T which indicates a new facsimile call has been initiated.

It should be noted that if an echo protection tone is transmitted during the facsimile call, it is transmitted immediately prior to the training sequence and/or the page data. The sequence of signals flowing to and from controller 114 is the same regardless of whether or not an EPT tone is present.

Figure 3:
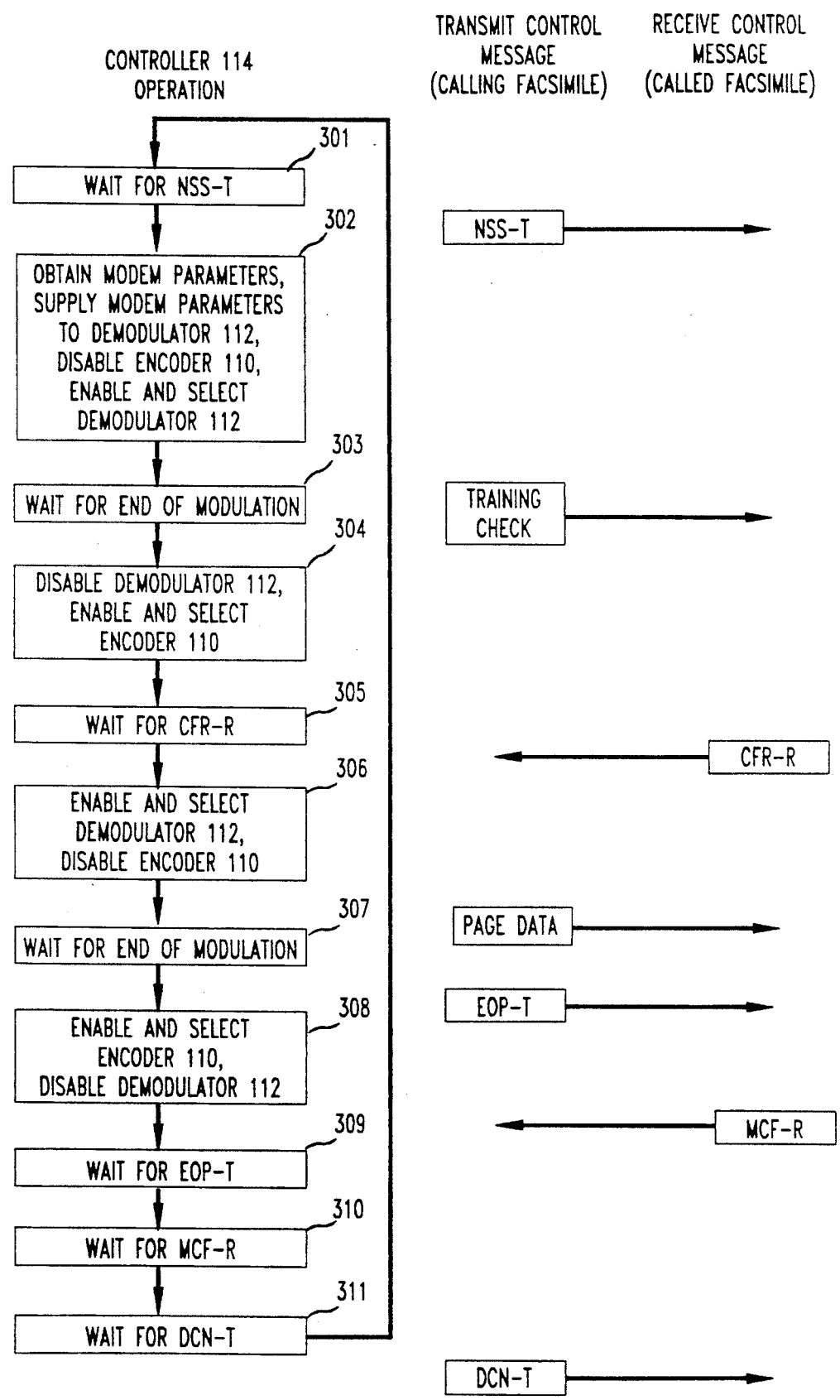
FIG. 3 graphically illustrates operation of controller 114 used in transmitter 101 of FIG. 1 for a so-called non-standard facsimile call.

A second simple example of the operation of controller 114 for a simple non-standard facsimile call is illustrated in FIG. 3. Accordingly, controller 114 in state 301 initially waits for NSS-T (non-standard set up transmit signal) transmit control message from control channel demodulator 111 in transmitter 101 (FIG. 1). In response to transmit control message NSS-T, controller 114 enters state 302 and extracts the facsimile vendor code and country code from known fields in transmit control message NSS-T. Using these fields as an index, controller 114 looks up the bit positions of the modem type and speed parameters from a so-called non-standard facsimile table. The table indicates where the bits are located in the NSS-T frame which identify the modem type to be used and its speed. Then, controller 114 extracts and interprets the actual modem type and speed bits from the transmitted NSS-T message and supplies these modem parameters to facsimile page demodulator 112. Additionally, controller 114 supplies a disable encoder signal to voiceband encoder 110, an enable page demodulator signal to facsimile page demodulator 112 and the modem parameters, i.e., modem type and speed, to facsimile page demodulator 112. Then, controller 114 enters state 303 and waits for an end of modulation (END) signal which indicates the end of the training check portion of the facsimile call. This end of modulation (END) signal is generated by facsimile page demodulator 112 and supplied to controller 114. Upon reception of the end of modulation (END) signal, controller 114 enters state 304 and supplies a disable page demodulator signal to facsimile page demodulator 112, an enable encoder signal to voiceband encoder 110 and a select voiceband encoder signal to selector 113. Then, controller 114 enters state 305 and waits for reception of receive control message CFR-R (Confirmation To Receive) from control channel demodulator 115. In response to receive control message CFR-R, controller 114 enters state 306 and supplies a disable encoder signal to voiceband encoder 110, an enable page demodulator signal to facsimile page demodulator 112 and a select page demodulator signal to selector 113. Then, controller 114 waits while the facsimile page information is demodulated to obtain the desired baseband digital bit stream which is supplied via selector 113 to transmission network 102 and, therein, to packet assembler 106 for transmission to remote packet disassembler 107 and, in turn, to receiver 103. thereafter, controller 114 enters state 307 and waits for another end of modulation (END) signal from facsimile page demodulator 112 indicating the end of the facsimile page data. Then, controller 114 enters state 308 and supplies the appropriate control signals to voiceband encoder 110, facsimile page demodulator 112 and selector 113 to select the voiceband path to be supplied to transmission network 102, as described above. Then, controller 114 enters state 309 and waits for transmit control message EOP-T (End of Procedure) and, subsequently, in state 310 waits for receive control message MCF-R (Message Confirmation) from control channel demodulator 115. Finally, controller 114 in state 311 waits for a transmit control message DCN-T (Disconnect) which indicates the end of facsimile call. Thereafter, controller 114 returns to state 301 and waits for a next transmit control message NSS-T which indicates a new facsimile call has been initiated.

Again, it is noted that if an echo protection tone is transmitted during the facsimile call, it is transmitted immediately prior to the training sequence and/or the page data. The sequence of signals flowing to and from controller 114 is the same regardless of whether or not an EPT tone is present.

Although operation of controller 114 has been described for a relatively simple facsimile call, it will be apparent to those skilled in the art how to expand the operation of controller 114 to any facsimile call, and specifically, those set forth in CCITT recommendation T.30, Revised, noted above.

CONTROL CHANNEL DEMODULATOR

Figure 4:
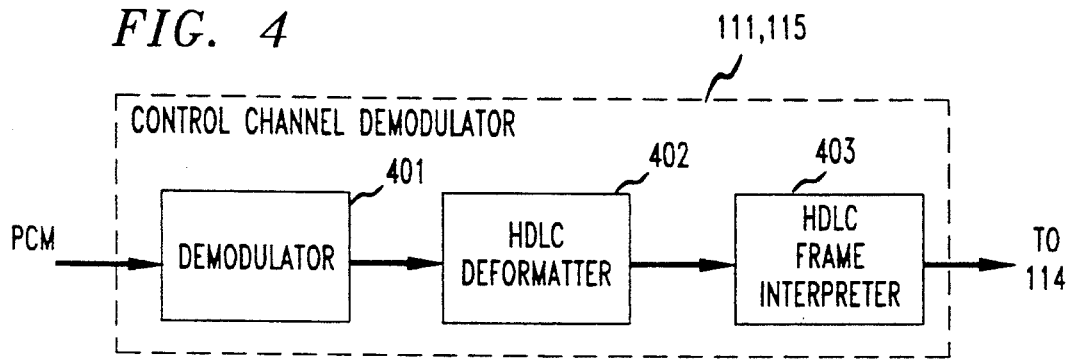
FIG. 4 depicts, in simplified block diagram form, details of control channel demodulators 111 and 115 used in transmitter 101 and receiver 104, respectively, of FIG. 1.

FIG. 4 shows, in simplified block diagram form, details of control channel demodulators 111 and 115, employed in transmitter 101 of FIG. 1 and receiver 104, respectively. Accordingly the transmit PCM digital signal is supplied to demodulator 401, which in this example, is a CCITT Recommendation V.21 demodulator of a type known in the art. It would be apparent to those skilled in the art that other formats, for example, CCITT Recommendation V.27ter, may equally be employed for control messages in a facsimile call. Demodulator 401, in this example, demodulates the control channel portion of the facsimile call. When used in control channel demodulator 111, demodulator 401 yields frames containing transmit control messages, as, for example, shown in FIGS. 2 and 3. When used in control channel demodulator 115, demodulator 401 yields frames containing receive control messages, also shown in FIGS. 2 and 3. The demodulated bits from demodulator 401 are supplied to High Level Data Link Control (HDLC) deformatter 402, where HDLC frame formatting is removed to yield the facsimile control messages in well known fashion. HDLC deformatter 402 also checks each frame for errors by calculating a cyclic redundancy check (CRC). In the event of an error, the corresponding HDLC frame is discarded. Such HDLC deformatters are known in the art (one example being the commercially available integrated circuit, Motorola MC68652). The HDLC frames are supplied to HDLC frame interpreter 403 to obtain the desired CCITT Recommendation T.30 control messages. HDLC frame interpreter 403 is, for example, a look up table including the known facsimile control messages as defined in the CCITT Recommendation T.30 noted above. The control messages are indexed in the table by bits in portions of the HDLC deformatted frames supplied from HDLC deformatter 402. Thereafter, the control messages and other parameters from the facsimile control protocol are supplied to controller 114.

FACSIMILE PAGE DEMODULATOR

FIG. 5 shows, in simplified, block diagram form, details of facsimile page demodulator 112 employed in transmitter 101 of FIG. 1. Accordingly, shown are page data demodulator 501, energy detector 502, training sequence detector 503, echo protection tone (EPT) detector 505 and arbiter 506. The transmit PCM digital signals are supplied to page data demodulator 501, energy detector 502, training sequence detector 503, and EPT detector 505. Also supplied to each of units 501, 502, 503 and 505 are enable and disable page demodulator signals, i.e., FAX=1 and FAX=0, respectively, and MODEM TYPE and MODEM SPEED parameters from controller 114. The FAX signal and MODEM TYPE and MODEM SPEED parameters are also supplied as control signals from facsimile page demodulator 112 to selector 113 and, in turn, to packet assembler 106 for inclusion in the facsimile packet header.

Page data demodulator 501 demodulates the facsimile page portion of the call to obtain a baseband digital bit stream which describes the facsimile page. This bit stream is supplied to selector 113 (FIG. 1) via controllable switch 504. Demodulation of the page signal conforms to CCITT Recommendation V.29. It will be apparent to those skilled in the art how to employ this arrangement when other modem types are used to modulate the baseband digital bit stream, for example, the CCITT Recommendation V.27ter or the CCITT Recommendation V.33.

Energy detector 502 is used to indicate the presence of a facsimile page signal on the PCM channel. It is enabled by the enable page demodulator signal from controller 114, and asserts the ACTIVE signal as long as energy is present. Detector 502 also generates the M-bit signal for inclusion in the facsimile packet header as described in FIG. 8.

Training sequence detector 503 is enabled by the enable page demodulator signal from controller 114 and the ACTIVE signal from energy detector 502(FAX*ACTIVE). During the early part of the energy spurt, if the channel signal is the alternations segment of the training sequence prescribed by MODEM TYPE and MODEM SPEED, TS-OK is asserted. Examples of typical training sequences are described in the CCITT V series recommendations for the modems which are prescribed by the CCITT T.30 Revised Recommendation previously cited. Another function of training sequence detector 503 is to activate controllable switch 504 at the boundary between the training sequence and the page data segment of the facsimile page signal to send the baseband digital bit stream to selector 113.

EPT detector 505 detects the presence of tone signals in the incoming PCM signal and the frequency of the detected tone signal. To this end, EPT detector 505 supplies an EPT indication signal to arbiter 506 during intervals that such tones are detected and supplies an EPT-FREQUENCY message to selector 113, which is representative of either a first predetermined frequency (A) or a second predetermined frequency (B). In this example, the EPT-FREQUENCY (A) is 1800 Hz and the EPT-FREQUENCY (B) is 1700 Hz. EPT detector 505 may be any tone detector capable of detecting the presence of energy at prescribed frequencies. In this example, EPT detector 505 is of a type similar to the tone detector described in U.S. Pat. No. 4,403,298 issued to C. J. May, Jr. on Sep. 6, 1983.

Figure 6:
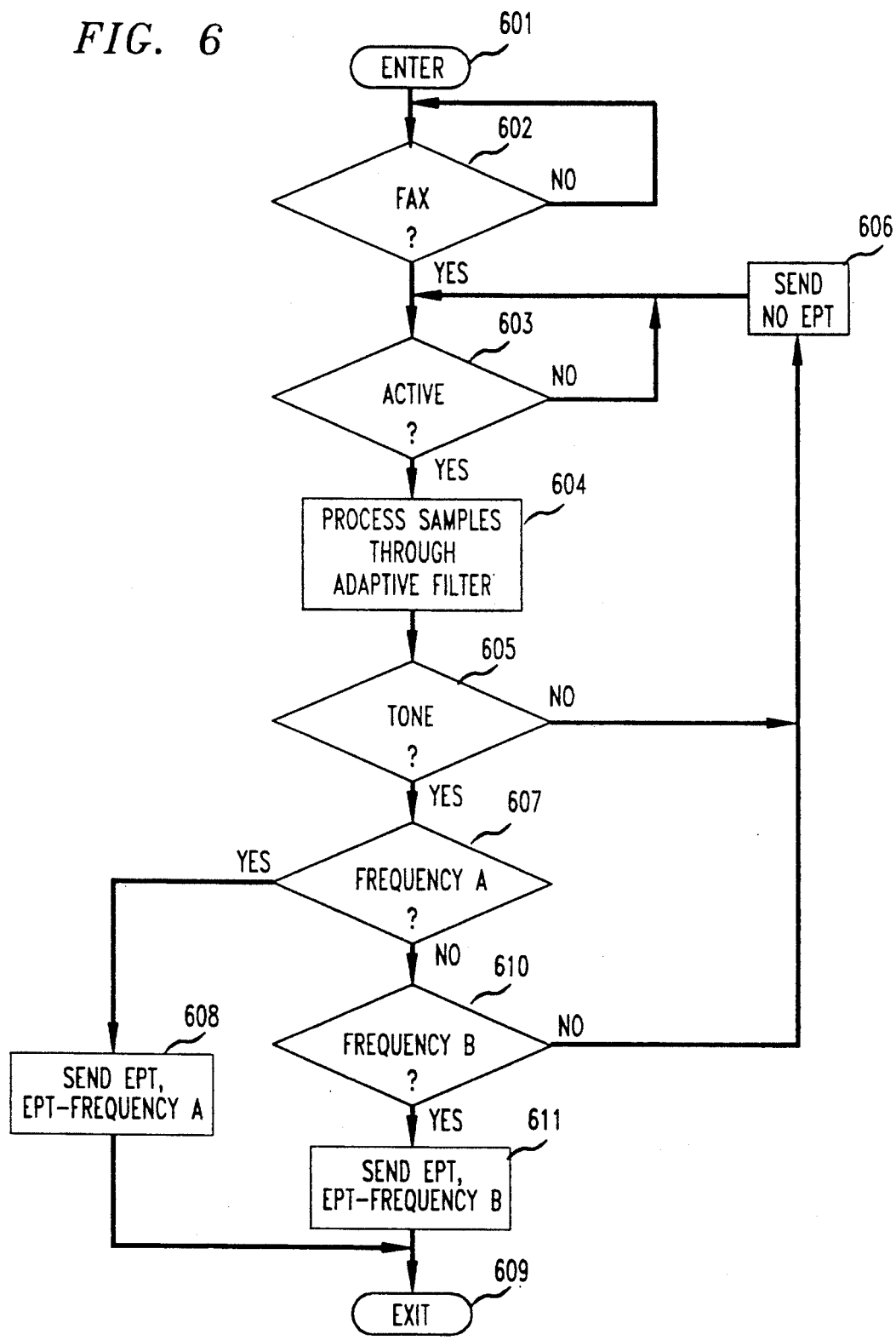
FIG. 6 is a flow chart showing the operation of EPT detector 505 of FIG. 5.

Operation of EPT detector 505 is shown in the flow chart of FIG. 6. Operation is entered via step 601. Thereafter, conditional branch point 602 tests to determine if FAX=1 which indicates that a facsimile call is in progress. The process remains in step 602 until FAX=1. Then, conditional branch point 603 tests to determine if the ACTIVE signal, i.e., start of energy, is asserted. If ACTIVE is asserted, energy is present and operational block 604 causes samples of the incoming PCM signal to be processed in an adaptive filter arrangement similar to that disclosed in the U.S. Pat. No. 4,403,298 noted above. Then, conditional branch point 605 tests if an echo protection tone (EPT) is present. If the test result is NO, operational block 606 sends a NO-EPT indication and control is returned to step 603. If the test result in step 605 is YES, a tone is present and conditional branch point 607 tests to determine if the tone is at a first predetermined frequency, i.e., frequency A. If the test result is YES, operational block 608 causes an EPT indication to be sent to arbiter 506 and an EPT-FREQUENCY message for frequency (A) to be sent to selector 113. Thereafter, the operation of EPT detector 505 is exited via step 609. If the test result in step 607 is NO, conditional branch point 610 tests to determine if the tone is at a second predetermined frequency, i.e., frequency B. If the test result is YES, operational block 611 causes an EPT indication to be sent to arbiter 506 and an EPT-FREQUENCY message for frequency B to be sent to selector 113. Thereafter, operation of EPT detector 505 is exited via 609. If the test result in step 610 is NO, step 606 causes a NO-EPT indication to be sent and control is returned to step 603.

Arbiter 506 is responsive to ACTIVE, TS-OK and the EPT signals to supply as an output to selector 113 either TSIP indicating the beginning of the training sequence prescribed by MODEM TYPE and MODEM SPEED or EPT-START and EPT-STOP delineating the interval of a detected echo protection tone. It also uses the transition of the ACTIVE signal from 1 to 0, to supply the END (of page demodulation) signal to controller 114.

As noted previously, if an echo protection tone is present, it will immediately precede the silence segment of the prescribed training sequence in either the training check (TCF) or the page data transmissions, but it's presence cannot be determined from the facsimile control messages and will not be known a priori by controller 114 or, consequently, by facsimile page demodulator 112. Additionally, the echo protection tone may not be differentiated from alternations in training sequence detector 503 so that TS-OK may be erroneously asserted in response to an echo protection tone. Therefore, it is necessary that arbiter 506 differentiate echo protection tones from alternations and send the correct indication (TSIP or EPT-START) to selector 113 and, subsequently, to the packet assembler 106.

FIG. 7 is a flow chart of steps in the operation of arbiter 506 (FIG. 5) in controlling the sending of EPT regeneration control messages, i.e., EPT-START, EPT-STOP, and TSIP to selector 113. Accordingly, operation is entered via step 701. Conditional branch point 702 tests to see if energy present signal ACTIVE is asserted. This step is repeated until the ACTIVE signal is asserted and a YES result is obtained. Then, conditional branch point 703 tests to determine if an EPT indication is present. If the test result is NO, conditional branch point 704 tests to determine if TS-OK (Training Sequence OK) is asserted. If the test result is NO, control is returned to step 702. If the test result in step 704 is YES, operational block 705 causes the TSIP signal to be sent to selector 113. Then, conditional branch point 706 tests if ACTIVE is asserted. The test is reiterated until a NO result is obtained. When a NO result is obtained, the modulation has ended and the end of modulation (END) signal is sent to controller 114 (FIG. 1). Thereafter, the operation of arbiter 506 is exited via step 708.

Returning to step 703, if the test result is YES, an echo protection tone (EPT) has been detected and operational block 709 causes an EPT-START signal to be sent to selector 113. Conditional branch point 710 tests to determine if ACTIVE is asserted. If the test result is YES, the echo protection tone is still present. Control remains in step 710 until ACTIVE is not asserted and a NO result is obtained. Thereafter, operational block 711 causes an EPT-STOP signal to be sent to selector 113.

In this manner the duration of the echo protection tone is denoted. Then, control is returned to step 702, and the process is iterated until TSIP is sent via step 705 and, thereafter, the end of modulation (END) signal is sent.

PACKET FORMATS

Shown in FIGS. 8 and 9 are two facsimile packet formats which are generated by packet assembler 106 (FIG. 1). FIG. 8 shows a long format which typically contains demodulated page data and FIG. 9 shows a short format which typically contains remodulator control information. It will be apparent to those skilled in the art how to assemble the packet header information in an efficient manner. The two formats have the first eight (8) fields in common. Each field includes eight (8) bits and is commonly referred to as an octet. Fields one (1) through six (6) are employed to transport the usual packet transmission information and are not unique to facsimile packets. Field seven (7) includes an M-bit position, subclass bit positions SC, digital modem class bit positions DMC and type of packet bit positions TYP. The SC bit positions transport an indication of whether the packet includes digital modem information, i.e., FAX=1, or voice information, i.e., FAX=0 or other information. It is again noted that during a facsimile call FAX=1 indicates that the output is from facsimile page demodulator 112 (FIG. 1) and FAX=0 indicates that the output is from voiceband encoder 110. The DMC bit positions transport an indication of whether the packet is in a facsimile call or in some other type of digital modem call. The TYP bit positions pertain to a DMC=FAX, i.e., a facsimile call, and they identify the type of packet in the facsimile call, for example, a page data packet or a so-called spurt header packet, as described below. Field eight (8) includes packet sequence number bit positions SEQ and BILO bit positions. The SEQ bit positions transport the packet sequence number and the BILO bit positions transport the number of data information bits in the last information field octet, namely, N. Fields one (1) through eight (8) form the facsimile packet header. For FIG. 8, fields nine (9) though N are the information fields that carry the demodulated page data. The CRC field transports the typical cyclic redundancy check bits.

FIG. 9 shows a so-called spurt header packet that is employed to transport remodulator control messages such as echo protection tone (EPT) regeneration and training sequence information. It is noted that no information field is included and, consequently, the EPT control messages and training sequence signals are more efficiently transported by use of the shorter spurt header packet. Fields one (1) through eight (8) are as described above regarding the packet format shown in FIG. 8. Field nine (9) includes action bit positions ACT and reserved bit positions RESV. The action bit positions transport the EPT control messages including EPT-START, EPT-FREQUENCY and EPT-STOP for EPT related spurt header packets and the TSIP signal for training sequence related spurt header packets. It is noted that for a training sequence packet, the absence of TSIP being asserted indicates that the training sequence is to be aborted. Fields 10, 11 and 12 are employed for miscellaneous remodulation control. Field 13 includes modem type bit positions MODEM and modem speed bit positions SPEED. It will be apparent to those skilled in the art how to assemble such packets. The packets are transmitted over known transmission media to a remote location where they are disassembled in well known fashion in packet disassembler 107 to obtain the desired information. In turn, the recovered information is supplied to receiver 103.

FACSIMILE PAGE REMODULATOR

Figure 10:
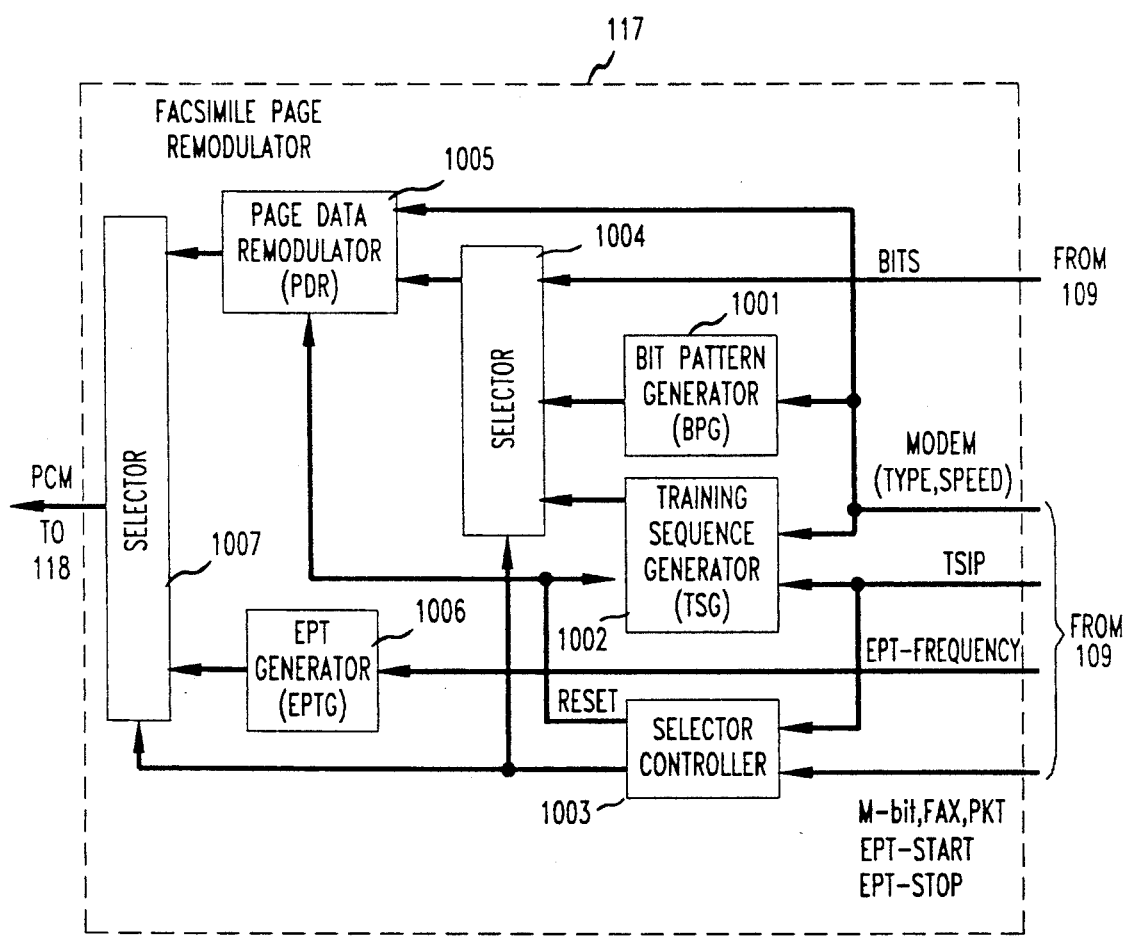
FIG. 10 depicts, in simplified block diagram form, details of facsimile page remodulator 117 of FIG. 1.

FIG. 10 shows, in simplified block diagram form, details of facsimile page remodulator 117 employed in receiver 104 of FIG. 1. Accordingly, shown are bit pattern generator (BPG) 1001, training sequence generator (TSG) 1002, selector controller 1003, selector 1004, page data remodulator 1005, EPT generator (EPTG) 1006 and selector 1007. Information from a received packet is obtained from packet disassembler 109, including information bits (BITS), training sequence in progress (TSIP), packet present (PKT), M-bit, the modem parameter information, i.e., MODEM TYPE and SPEED, the facsimile call indicator FAX and echo protection tone information, i.e., EPT-FREQUENCY, EPT-START and EPT-STOP. The FAX signal enables and disables facsimile page remodulator 117, as explained below. The page data information (BITS) is supplied to selector 1004. TSIP is supplied to training sequence generator 1002. TSIP, M-bit, FAX, PKT, EPT-START and EPT-STOP are supplied to selector controller 1003. It is noted that PKT is generated by packet disassembler 109 and indicates whether or not a packet is present. The modem parameters, i.e., MODEM TYPE and SPEED, are supplied to units 1001, 1002, and 1005. Bit pattern generator (BPG) 1001 is responsive to the MODEM TYPE and SPEED parameters for continually supplying as an output an optimized set of bits to selector 1004 for the purpose of compensating for an inadvertent loss of packet. This set of bits is needed to maintain proper operation of page data remodulator 1005 in the event that there is no page data information (BITS) from a received packet. Training sequence generator 1002 is also responsive to the MODEM TYPE and SPEED parameters and TSIP to regenerate data bit patterns indicative of the appropriate training sequence to be supplied to selector 1004. Training sequence generator 1002 is responsive to a RESET signal from selector controller 1003 to initialize generation of the appropriate training sequence. Page data remodulator 1005 is responsive to the modem parameters, i.e., TYPE and SPEED, and to the RESET signal from selector controller 1003, to remodulate the baseband facsimile page portion of the facsimile call (BITS) from selector 1004 to reconstruct a modem modulated facsimile signal. Page data remodulator 1005 is, in this example, a CCITT Recommendation V.29 type remodulator. Again, it will be apparent to those skilled in the art that other CCITT facsimile formats maybe employed, for example V.27ter or V.33. EPT generator (EPTG) 1006 is responsive to EPT-FREQUENCY to generate either an EPT-FREQUENCY (A) or an EPT-FREQUENCY (B) echo protection tone signal.

Selector controller 1003 selects either BITS, an output from bit pattern generator (BPG) 1001, or an output from training sequence generator (TSG) 1003 to be supplied via selector 1004 to page data remodulator 1005. Selector controller 1003 also operates to select either an output from page data remodulator 1005 or an output from EPT generator 1006 to be supplied via selector 1007 as the PCM signal to selector 118 (FIG. 1). Additionally, a RESET signal is supplied from selector controller 1003 to training sequence generator 1002 and page data remodulator 1005.

Figure 11:
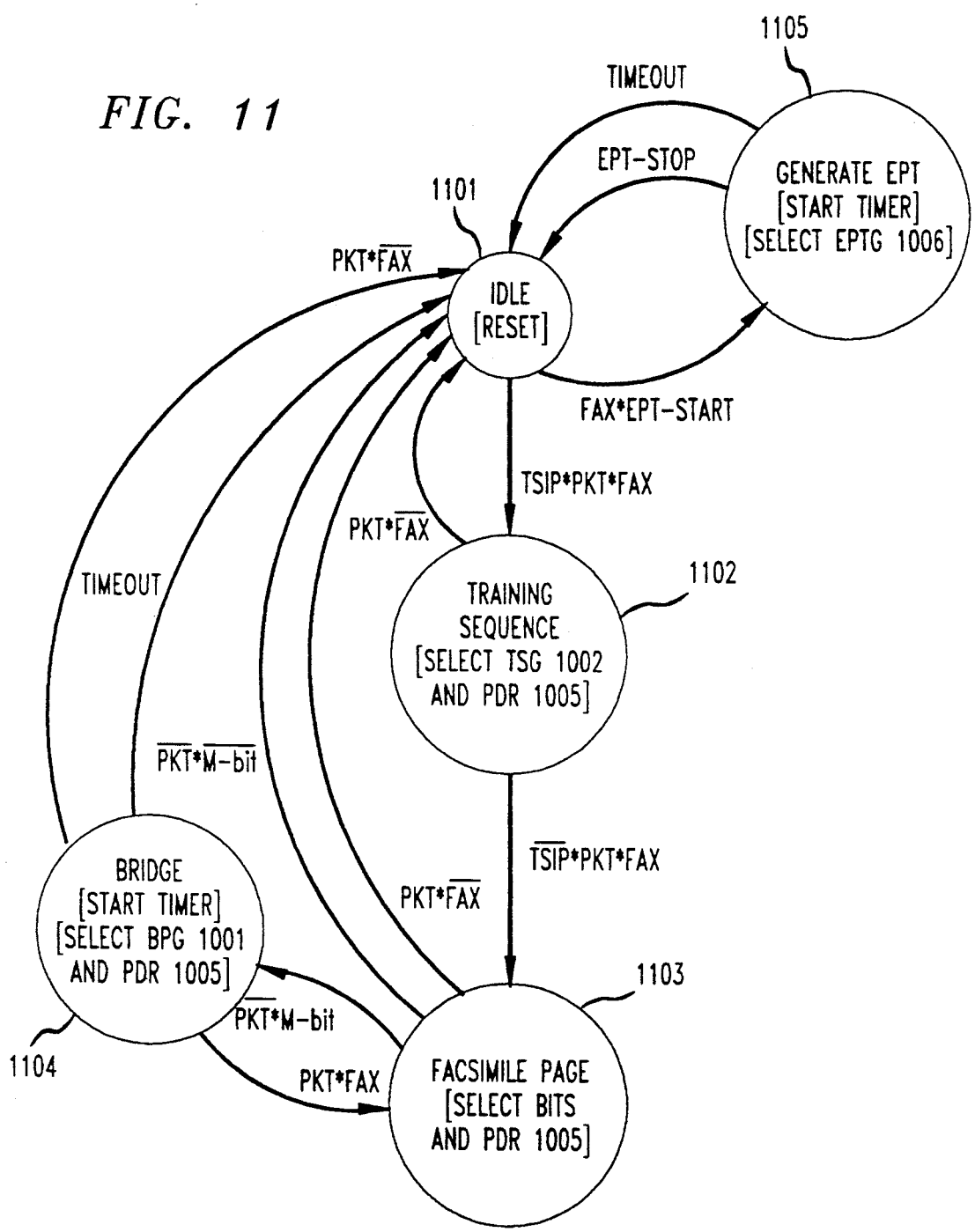
FIG. 11 is a state diagram illustrating operation of selector controller unit 1103 employed in facsimile page remodulator 117 of FIG. 10.

FIG. 11 shows a state diagram illustrating states in the operation of selector controller 1003. Accordingly, selector controller is initially in idle state 1101 waiting for a training sequence facsimile spurt header packet as indicated by TSIP, PKT and FAX being asserted (TSIP*PKT*FAX), or an echo protection tone (EPT) spurt header packet indicated by FAX*EPT-START. Upon receipt of the asserted TSIP, PKT and FAX signals, selector controller 1003 transitions to training sequence state 1102. During state 1102, selector 1004 is configured to select the training sequence output from TSG 1002 and selector 1007 is configured to select the output from PDR 1005. If while in state 1102, FAX is negated, i.e., not asserted ($\overline{FAX}$), selector controller 1003 transitions back to idle state 1101 and a RESET is generated. Otherwise, while in state 1102, selector controller 1003 waits for a normal (as opposed to a training sequence) facsimile page information packet (indicated by $\overline{TSIP}$*PKT*FAX). If this event does not occur by the end of a training sequence, controller 1003 transitions back to idle state 1101 and resets remodulator 1005. Upon the occurrence of this event (i.e., $\overline{TSIP}$*PKT*FAX), selector controller 1003 transitions to facsimile page state 1103. During state 1103, selector 1004 is configured to select BITS as an output and selector 1007 is configured to select an output from PDR 1005. Selector controller 1003 remains in facsimile page state 1103 until packets stop arriving (indicated by occurrence of $\overline{PKT}$) or FAX is negated (indicated by $\overline{FAX}$). If $\overline{PKT}$ occurs and the M-bit is not set as indicated by ($\overline{PKT}$*M-BIT), or if PKT is asserted and FAX is negated (indicated by PKT*$\overline{FAX}$), selector controller 1003 transitions back to idle state 1101. While in state 1103, if $\overline{PKT}$ occurs and the M-bit of the previous packet was set, a packet has been lost as indicated by ($\overline{PKT}$*M-BIT), and selector controller 1003 transitions to bridge state 1104. During bridge state 1104, selector 1004 is configured to supply the output from BPG 1001 to page data remodulator 1005 and selector 1007 is configured to supply an output from PDR 1005. Additionally, a timer (not shown) is initiated. If during the timer interval, a packet (PKT) arrives and FAX is asserted as indicated by (PKT*FAX), the timer is disabled, and selector controller 1003 transitions back to facsimile page state 1103. In state 1103, selector 1004 is again configured to supply BITS to page data remodulator 1005 and selector 1007 is configured to continued to select an output from PDR 1005. Alternatively, if the timer interval expires while selector controller 1003 is in bridge state 1104, the lost packet was the last packet of the facsimile page and selector controller 1003 transitions to idle state 1101 waiting for the next facsimile page information. Additionally, if while in state 1104, FAX is negated and PKT is asserted as indicated by (PKT*$\overline{FAX}$), selector controller 1003 transitions back to idle state 1101. While in idle state 1101, selector controller 1003 generates a RESET signal, which resets both page data remodulator 1005 and training sequence generator 1002. If while in idle state 1101 and FAX is asserted and EPT-START indication is asserted, selector controller 1003 transitions into the generate EPT state 1105. While in state 1105 a timer (not shown) is enabled and selector controller 1003 configures selector 1007 to select an output from EPTG 1006 to be supplied as an output. While in state 1105, if an EPT-STOP indication is received or the timer has timed out, selector controller 1003 transitions back to idle state 1101. The timer limits the EPT signal being generated to a predetermined maximum interval.

We claim:

1. Network transmitter apparatus for transmitting voiceband signals from at least voice and/or facsimile calls to a digital transmission network for transmission to a remote network receiver, the facsimile calls having portions including facsimile call control messages and portions including modulated facsimile page data, the network transmitter apparatus including, means for demodulating the control message portion of the facsimile call to obtain demodulated facsimile call control messages, control means supplied with said demodulated facsimile call control messages for generating facsimile page data demodulation control signals and a facsimile call indication (FAX) signal, said FAX signal being representative of whether a current portion of the call is the facsimile call control message portion or the facsimile call facsimile page data portion;

means for encoding voiceband signals, controllable means responsive to said facsimile page data demodulation control signals and said FAX signal for demodulating facsimile call page data into a baseband digital bit stream and for generating additional control signals, said facsimile page data demodulation control signals, said FAX signal and said additional control signals being supplied as facsimile call remodulation control signals as an output from said controllable means with said baseband digital bit stream, and means responsive to said FAX signal for supplying an output to the digital transmission network for transmission to said remote network receiver from said means for encoding voiceband signals during facsimile call control message portions of the facsimile call and for supplying an output to the digital transmission network for transmission to said remote network receiver from said controllable means during facsimile page data portions of the facsimile call, wherein encoded facsimile call control message portions of the facsimile call and said FAX signal, and said baseband digital bit stream representative of facsimile page data portions of the facsimile call and said facsimile call remodulation control signals are appropriately supplied to the transmission network, said controllable means being characterized by means responsive to said facsimile page data demodulation control signals for detecting a training sequence in the facsimile page data portion of the facsimile call, means for detecting echo protection tone (EPT) signals in the facsimile page data portion of the facsimile call, means for differentiating whether a training sequence has been detected or one of said echo protection tone signals has been detected and for generating an additional control message representative of either a detected training sequence or a detected one of said echo protection tone signals as a result of said differentiating, and wherein said means for supplying further supplies said additional control message with said remodulation control signals as an output to said digital transmission network for transmission to said remote network receiver.

2. The apparatus as defined in claim 1 wherein said means for detecting echo protection tone signals further detects the frequency of a detected echo protection tone signal and generates a frequency control message indicative of the detected tone signal frequency and wherein said means for supplying as an output further supplies said frequency control message along with said remodulation control signals and said additional control message to said digital transmission network.

3. The apparatus as defined in claim 2 wherein said means for detecting a training sequence generates a training sequence control signal representative of presence of a training sequence, said means for detecting echo protection tone signals generates a tone present indication signal, and said means for differentiating and for generating control messages is further responsive to said training sequence control signal and to said echo protection tone indication signal to differentiate said detected echo protection tone signal from prescribed signals in said training sequence.

4. The apparatus as defined in claim 3 further including means for detecting and for generating an energy detected control signal indicative of the presence of energy in said facsimile page data portion of the facsimile call.

5. The apparatus as defined in claim 4 wherein said means for differentiating and for generating control messages is further responsive to said energy detected control signal, said tone indication signal and said training sequence control signal for generating tone control messages representative of the start of a detected tone signal and the end of a detected tone signal and wherein said means for supplying further supplies said tone control messages to said digital transmission network.

6. The apparatus as defined in claim 5 wherein said means for differentiating and for generating control messages is further responsive to said energy detected control signal, said echo protection tone indication signal and said training sequence control signal for controllably generating a training sequence in progress control message indicative of a detected training sequence in said facsimile page data portion of the facsimile call.

7. The apparatus as defined in claim 6 wherein said prescribed signals in said training sequence are alterations.

8. Network receiver apparatus for receiving a digital bit stream including voiceband signal representations of at least voice and/or facsimile calls from a digital transmission network that was transmitted by a remote network transmitter, the network receiver apparatus comprising:
means for decoding encoded voiceband signals in the received digital bit stream from the transmission network;
controllable means responsive to received facsimile call remodulation control signals from the received digital bit stream for recomposing facsimile call page data from a received baseband digital bit stream in the received digital bit stream; and
means responsive to a received facsimile call indication (FAX) signal from the received digital bit stream for supplying an output from either said means for decoding or said controllable means, wherein the output from said means for decoding includes facsimile call control messages and is selected as the output when said received FAX signal indicates a facsimile call control message portion of the facsimile call and where in the output from said controllable means includes representations of modulated facsimile call page data and is selected as the output when said received FAX signal indicates a facsimile call page data portion of the facsimile call,
said controllable means being characterized by
means responsive to said obtained control messages for remodulating portions of the received digital bit stream to obtain a training sequence portion of a facsimile call and
means responsive to an obtained frequency control message for generating an echo protection tone (EPT) signal having a prescribed frequency, and
wherein said means for supplying includes means responsive to said obtained control messages for selecting as an output the generated echo protection tone signal or an output from said means for remodulating.

9. The apparatus as defined in claim 8 wherein said frequency control message is representative of an echo protection tone signal having at least a first predetermined frequency.

10. The apparatus as defined in claim 9 wherein said obtained messages include at least a facsimile call in progress (FAX) control message, a start of echo protection tone signal (EPT-START) control message and an end of echo protection signal (EPT-STOP) control message.

11. The apparatus as defined in claim 10 wherein said means for selecting is controllably responsive to said FAX, EPT-START and EPT-STOP control messages to controllably select as an output the generated echo protection tone signal.

12. Network apparatus including network transmitter means for transmitting digital signals representative of at least voice and/or facsimile calls to a digital transmission network for transmission to a remote network receiver means for receiving digital signals representative of the at least voice and/or facsimile calls, the facsimile calls having portions including facsimile call control messages and portions including modulated facsimile page data, said network transmitter means including,
means for demodulating the control message portion of the facsimile call to obtain demodulated facsimile call control messages,
control means supplied with said demodulated facsimile call control messages for generating facsimile page data demodulation control signals and a facsimile call indication (FAX) signal, said FAX signal being representative of whether a current portion of the call is the facsimile call control message portion or the facsimile call facsimile modulated page data portion,
means for encoding voiceband signals,
first controllable means responsive to said facsimile page data demodulation control signals and said FAX signal for compressing facsimile call page data into a baseband digital bit stream and for generating additional control signals, said facsimile page data demodulation control signals, said FAX signal and said additional control signals being suplied as facsimile call remodulation control signals as an output from said first controllable means with said baseband digital bit stream, and
first means responsive to said FAX signal for supplying an output to the transmission network for transmission to said remote network receiver from said means for encoding voiceband signals during facsimile call control message portions of the facsimile call and for supplying an output to the transmission network from said first controllable means during facsimile page data portions of the facsimile call, and said FAX signal and said baseband digital bit stream representative of facsimile page data portions of the facsimile call and said facsimile call remodulation control signals are appropriately supplied to the transmission network, said first controllable means being characterized by means responsive to said facsimile page data demodulation control signals for detecting a training sequence in the facsimile page data portion of the facsimile call, means for detecting echo protection tone signals in the facsimile page data portion of the facsimile call and for generating a frequency control message indictive of the detected echo protection tone signal frequency, means for differentiating whether a training sequence has been detected or one of said echo protection tone signals has been detected and for generating an additional control message representative of either a detected training sequence or a detected one of said echo protection tone signals as a result of said differentiating, and said first means for supplying further supplies said additional control message and said frequency control message with said remodulation controls signals as an output to said digital transmission network for transmission to said remote receiver; and said network receiver means including, means for decoding encoded voiceband signals in the received digital bit stream from the digital transmission network, second controllable means responsive to received facsimile call remodulation control signals from the received digital bit stream from the digital transmission network for recomposing facsimile call page data from a received baseband digital bit stream in the received digital bit stream, and second means responsive to a received FAX signal from the received digital bit stream for supplying an output from either said means for decoding or said second controllable means, wherein the output from said means for decoding includes said facsimile call control messages and is selected as the output when said received FAX signal indicates a facsimile call control message portion of the facsimile call and wherein the output from said second controllable means includes representations of modulated facsimile call page data and is selected as the output when said received FAX signal indicates a facsimile call page data portion of the facsimile call, said second controllable means being characterized by means responsive to said additional control message for remodulating portions of the received digital bit stream to obtain a training sequence portion of a facsimile call and means responsive to an obtained frequency control message for generating an echo protection tone signal having a prescribed frequency, and wherein said second means for supplying further includes means responsive to said obtained control messages for selecting as an output the generated echo protection tone signal or an output from said means for remodulating.

* * * * *